(12) United States Patent
Phillips et al.

(10) Patent No.: US 8,439,378 B2
(45) Date of Patent: May 14, 2013

(54) SYSTEM AND METHOD FOR POSITIONING AND RESTRAINING AN AIR SPRING WITHIN A VEHICLE SUSPENSION

(75) Inventors: Michael Lynch Phillips, Elmhurst, IL (US); Anthony Joseph Bills, Romeoville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 380 days.

(21) Appl. No.: 12/706,736

(22) Filed: Feb. 17, 2010

(65) Prior Publication Data

US 2010/0207372 A1    Aug. 19, 2010

Related U.S. Application Data

(60) Provisional application No. 61/153,603, filed on Feb. 18, 2009.

(51) Int. Cl.
*B60G 9/02* (2006.01)

(52) U.S. Cl.
USPC ...... 280/124.116; 280/124.157; 280/124.128; 280/124.151; 280/124.153; 267/64.19

(58) Field of Classification Search ............... 267/64.19, 267/64.21, 64.23, 64.24, 64.27; 280/124.157, 280/124.116, 124.154, 124.153, 124.11
See application file for complete search history.

(56) References Cited

U.S. PATENT DOCUMENTS

| | | |
|---|---|---|
| 6,851,689 B2 | 2/2005 | Dudding et al. |
| 6,945,548 B2 | 9/2005 | Dudding et al. |
| 7,182,354 B2 | 2/2007 | Dudding |
| 2005/0051986 A1 | 3/2005 | Galazin et al. |
| 2006/0049600 A1 | 3/2006 | Dudding et al. |
| 2007/0126263 A1 | 6/2007 | Ramsey et al. |
| 2007/0145704 A1 | 6/2007 | Chan et al. |
| 2008/0150272 A1 | 6/2008 | Pitsenbarger et al. |
| 2008/0224435 A1 | 9/2008 | Holt |
| 2008/0231034 A1 | 9/2008 | Carr et al. |
| 2009/0032673 A1 | 2/2009 | Dron et al. |
| 2009/0302514 A1* | 12/2009 | Grabarz et al. ............ 267/64.27 |

OTHER PUBLICATIONS

Neway (SAF Stand) Brisbane 2009.
Hendrickson, HAS Series, Parts List, Lit No. SP-149, Revision E, 12 pages (Mar. 2005).
Declaration of Tony Bills Regarding Experimental Use.

* cited by examiner

*Primary Examiner* — Ruth Ilan
(74) *Attorney, Agent, or Firm* — McDonnell Boehnen Hulbert & Berghoff

(57) ABSTRACT

Vehicle suspension assemblies including air spring assemblies and components of the vehicle suspension assemblies are described. A vehicle suspension assembly that is attachable to a pair of vehicle frame rails includes a pair of support beams and a cross member, such as a cross tube, extending between and connected to the pair of support beams. Each support beam includes a locator-tab and each air spring assembly includes a locator-tab-slot for receiving a locator-tab of a support beam. The cross tube is fastened to the air spring assembly via a retention strap that wraps around portions of the cross tube. The locator-tabs and locator-tab-slots may be operable, alone or in combination with the retention strap, as a lateral restraint. In this regard, the lateral restraint may restrain the air spring from moving in a lateral direction between two frame rails to which the vehicle suspension assembly attaches.

17 Claims, 11 Drawing Sheets

SYSTEM AND METHOD FOR POSITIONING AND RESTRAINING AN AIR SPRING WITHIN A VEHICLE SUSPENSION

RELATED APPLICATION

This application claims the benefit of U.S. Provisional Application No. 61/153,603, filed Feb. 18, 2009. U.S. Provisional Application No. 61/153,603 is hereby incorporated by reference.

BACKGROUND

Vehicles, such as vocational and heavy haul trucks, are operable to transport objects (e.g., people, livestock, rubbish, cement, and/or earth materials such as dirt and sand). Such vehicles may comprise a single rate or variable rate suspension.

Single rate suspensions have a fixed spring rate that generally must be set to produce a suspension with either a comfortable ride or a stiff suspension that exhibits adequate roll stability. As a result, either roll stability or ride quality is compromised in a single rate suspension, depending upon the spring rate set for the vehicle.

Variable rate suspensions overcome the deficiency of single rate suspensions by providing multiple spring rates during operation of the vehicle. For instance, as a spring load increases, a spring rate correspondingly increases, and as the spring load decreases, the spring rate correspondingly decreases.

A vocational or heavy haul truck may, for example, achieve a variable rate suspension through the use of bolster springs and auxiliary springs. Alternatively, a vocational or heavy haul truck may, for example, achieve a variable rate suspension through the use of air springs.

Air springs may comprise a bellows that forms at least a portion of an air chamber. A variable spring rate may be achieved by varying the amount of air contained within the air chamber. Although air springs may be used to achieve a variable spring rate, bellows are susceptible to wear and tear that leads to replacement of the bellows and/or air spring.

OVERVIEW

This overview presents example embodiments that comprise features for positioning and restraining an air spring within a vehicle suspension. These and other example embodiments are described in the detailed description that follows.

In one respect, an example embodiment may take the form of a vehicle suspension assembly that includes (i) multiple support beams, (ii) multiple air springs, (iii) at least one cross tube that extends between two support beams, and (iv) multiple retention straps. Each of the support beams comprises a respective locator-tab. Each of the air springs comprises one or more locator-tab-slots for receiving a locator-tab. At least one locator-tab-slot of each air spring may be positioned above a locator-tab and then moved towards the locator-tab to receive the locator-tab. After the locator-tab-slot receives the locator-tab, the retention strap may be fastened to the air spring so as to retain the air spring and prevent and/or reduce forward and aft movement of the air spring relative to the cross tube.

The locator-tabs and locator-tab-slots may be operable, alone or in combination with the retention strap, as a lateral restraint. In this regard, the lateral restraint may restrain the air spring from moving in a lateral direction between two frame rails to which the vehicle suspension assembly attaches. Additionally, the locator-tabs and locator-tab-slots preferably accommodate all lateral loads placed upon the vehicle suspension assembly during articulation of the suspension assembly.

In accordance with the example vehicle suspension assembly, the locator-tabs and locator-tab-slots are located such that a bellows of the air spring will not contact the locator-tab during operation of the air spring. In this way, wear and tear of the bellows due to contact with a locator-tab may be prevented, which may lead to a longer service life for the bellows and air spring.

In another respect, an example embodiment may take the form of a vehicle suspension assembly that includes (i) a first air spring that comprises a first locator-tab-slot, (ii) a second air spring that comprises a second locator-tab-slot, (iii) a first support beam, (iv) a second support beam, (v) a cross member connected to the first support beam and to the second support beam, (vi) a first locator-tab positioned within the first locator-tab-slot, and (vii) a second locator-tab positioned within the second locator-tab-slot.

In another respect, an example embodiment may take the form of a vehicle suspension assembly that includes (i) a first air spring that comprises a first locator-tab-slot, (ii) a second air spring that comprises a second locator-tab-slot, (iii) a first support beam that comprises a first locator-tab, (iv) a second support beam that comprises a second locator-tab, and (v) a cross member connected to the first support beam and to the second support beam. In accordance with this example embodiment, the first locator-tab is positioned within the first locator-tab-slot, and the second locator-tab is positioned within the second locator-tab-slot.

In yet another respect, an example embodiment may take the form of a vehicle suspension assembly that includes (i) a first air spring that comprises a first locator-tab-slot, (ii) a second air spring that comprises a second locator-tab-slot, (iii) a first support beam that comprises a first locator-tab, (iv) a second support beam that comprises a second locator-tab, and (v) a cross tube connected to the first support beam and to the second support beam. In accordance with this example embodiment, the first locator-tab is positioned within the first locator-tab-slot, and the second locator-tab is positioned within the second locator-tab-slot.

In still yet another respect, an example embodiment may take the form of a suspension support beam that includes (i) a first support beam end, (ii) a second support beam end, (iii) a support beam top side, (iv) a support beam bottom side, (v) a support beam inboard side, (vi) a support beam outboard side, (vii) a cross tube receiving portion positioned between the support beam top side and the support beam bottom side, and (vii) a locator-tab located on the support beam top side and above at least a portion of the cross tube receiving portion. In accordance with this example embodiment, the support beam top side, the support beam bottom side, the support beam inboard side, and the support beam outboard side all extend longitudinally from the first support beam end to the second support beam end.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

1. Introduction

This description describes example embodiments that may be arranged in various forms including, but not limited to, (i) a support beam arranged for use within a vehicle suspension assembly, (ii) a cross tube arranged for use within a vehicle suspension assembly, (iii) a cross member for use within a vehicle suspension assembly, (iv) a U-assembly comprising a pair of support beams and a cross tube, (v) a U-assembly comprising a pair of support beams and a cross member, and (vi) a vehicle suspension assembly. The example embodiments may include and/or interface to one or more air spring assemblies. The example embodiments may include locator-tabs and locator-tab-slots that are operable to position and restrain an air spring assembly within a vehicle suspension assembly.

For purposes of this description, unless specifically described otherwise, "vehicle" refers to a vehicle (e.g., a semi-tractor, a vocational truck, a heavy-haul truck, a bus, a military vehicle, a fire truck, a fire/rescue vehicle, a vehicle for plowing snow, construction equipment, oil-field equipment, a freight train, a passenger train or some other vehicle) and/or a vehicle trailer (e.g., a semi-tractor trailer). Furthermore, for purposes of this description, a left side of a vehicle refers to a side of the vehicle on an observer's left-hand side when the observer, standing behind the vehicle, faces forward while looking at the back of the vehicle, and a right side of the vehicle refers to a side of the vehicle on an observer's right-hand side when the observer, standing behind the vehicle, faces forward while looking at the back of the vehicle. Furthermore still, for purposes of this description, "outboard" refers to a position further away from a center line, running longitudinally from the front to the back of a vehicle, relative to "inboard" which refers to a position closer to that same center line.

2. Example Support Beams

Figure 2:
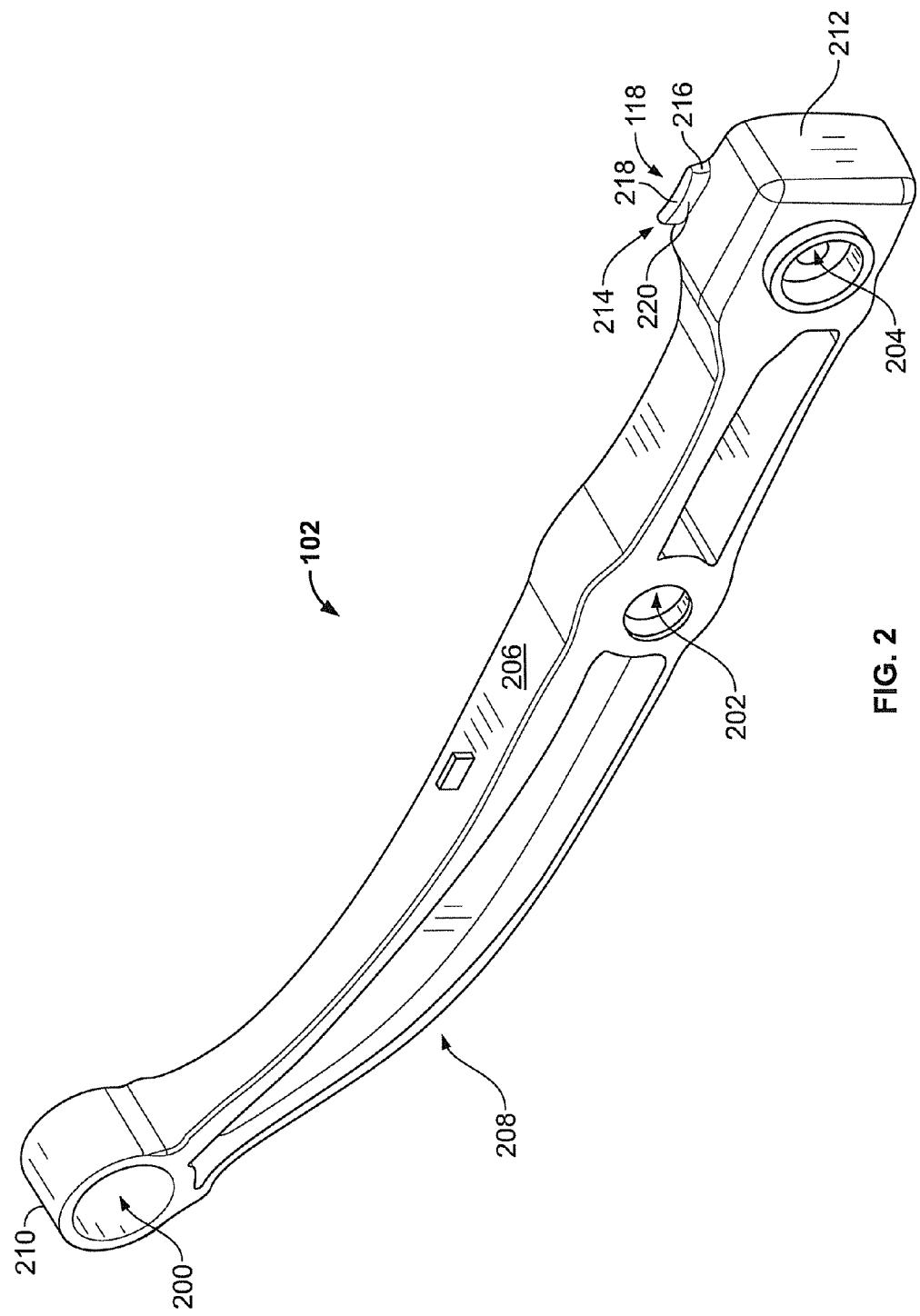
FIG. 2 depicts a support beam in accordance with an example embodiment.

A vehicle suspension assembly may include multiple support beams. FIG. 2 depicts an example support beam. In particular, FIG. 2 depicts a left-hand support beam 102 that includes a locator-tab 118, a frame hanger mounting hole 200, an axle clamp group mounting hole 202, a cross tube mounting hole 204, a support beam first end 210, and a support beam second end 212. Left-hand support beam also includes a support beam top side 206, a support beam bottom side (not shown), a support beam outboard side 208, and a support beam inboard side 300 (shown in FIG. 3). A respective bushing may be installed into frame hanger mounting hole 200 and axle clamp group mounting hole 202. A respective steel rod may be installed into the bushings installable into frame hanger mounting hole 200 and axle clamp group mounting hole 202.

Locator-tab 118 includes a locator-tab first end 214, a locator-tab second end 216, a locator-tab top side 218, and a locator-tab outboard side 220. Locator-tab outboard side 220 may be parallel or substantially parallel to a locator-tab inboard side 120 (shown in FIG. 1 and FIG. 3) of locator-tab 118. Locator-tab top side 218 may comprise a surface that slopes from locator-tab outboard side 220 to locator-tab inboard side 120. Locator-tab top side 218 may, for example, slope at an angle of 5.0 degrees or some other number of degrees.

Locator-tab 118 may have various dimensions. The height of locator-tab 118 from the support beam top side 206 directly above cross tube mounting hole 204 to a highest portion of locator-tab top side 218 may, for example, be 16.4 mm. The width of locator-tab 118 from locator-tab first end 214 to locator-tab second end 216 may, for example, be 56.1 mm. And a depth of locator-tab 118 from locator-tab outboard side 220 to locator-tab inboard side 120 may, for example, be 15.7 mm. Other examples of those dimensions are also possible.

Figure 3:
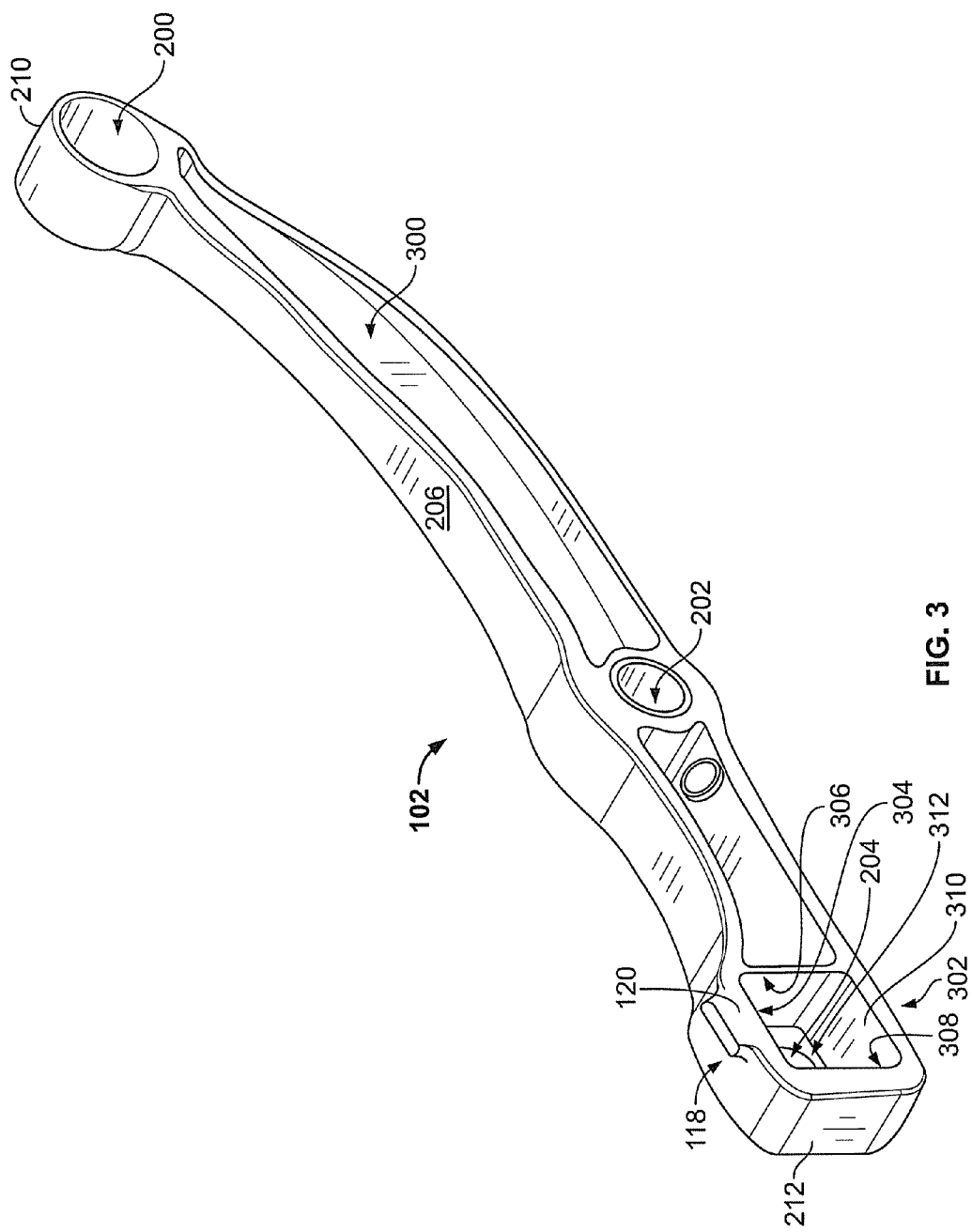
FIG. 3 depicts a support beam in accordance with an example embodiment.

FIG. 3 depicts additional details of left-hand support beam 102. As shown in FIG. 3, left-hand support beam 102 includes support beam inboard side 300 and a cross tube receiving portion 302. Cross tube receiving portion 302 may comprise a top wall 304, side wall 306, side wall 308, a bottom wall 310, and a back wall 312. FIG. 3 depicts the inboard side of frame hanger mounting hole 200 and the inboard side of axle clamp group mounting hole 202.

In an example embodiment, top wall 304, side wall 306, side wall 308, and bottom wall 310 may be sloped such that a cross section of cross tube receiving portion 302 nearest support beam inboard side 300 is larger than cross sections of cross tube receiving portion 302 that are farther away from support beam inboard side 300. For purposes of this description, the cross sections of cross tube receiving portion 302 are cross sections perpendicular to an axis passing through cross tube mounting hole 204 and into cross tube receiving portion 302. By way of example, top wall 304, side wall 306, side wall 308, and bottom wall 310 may each be sloped at an angle between 0 degrees and 10 degrees but not including 0 degrees. Other examples of the number of degrees that those walls are sloped are also possible.

In another example embodiment, top wall 304, side wall 306, side wall 308, and bottom wall 310 may each comprise a straight-sided wall that is not sloped. For that example embodiment, each cross section of cross tube receiving portion 302 is the same size or substantially the same size.

3. Example U-Assembly

Figure 5:
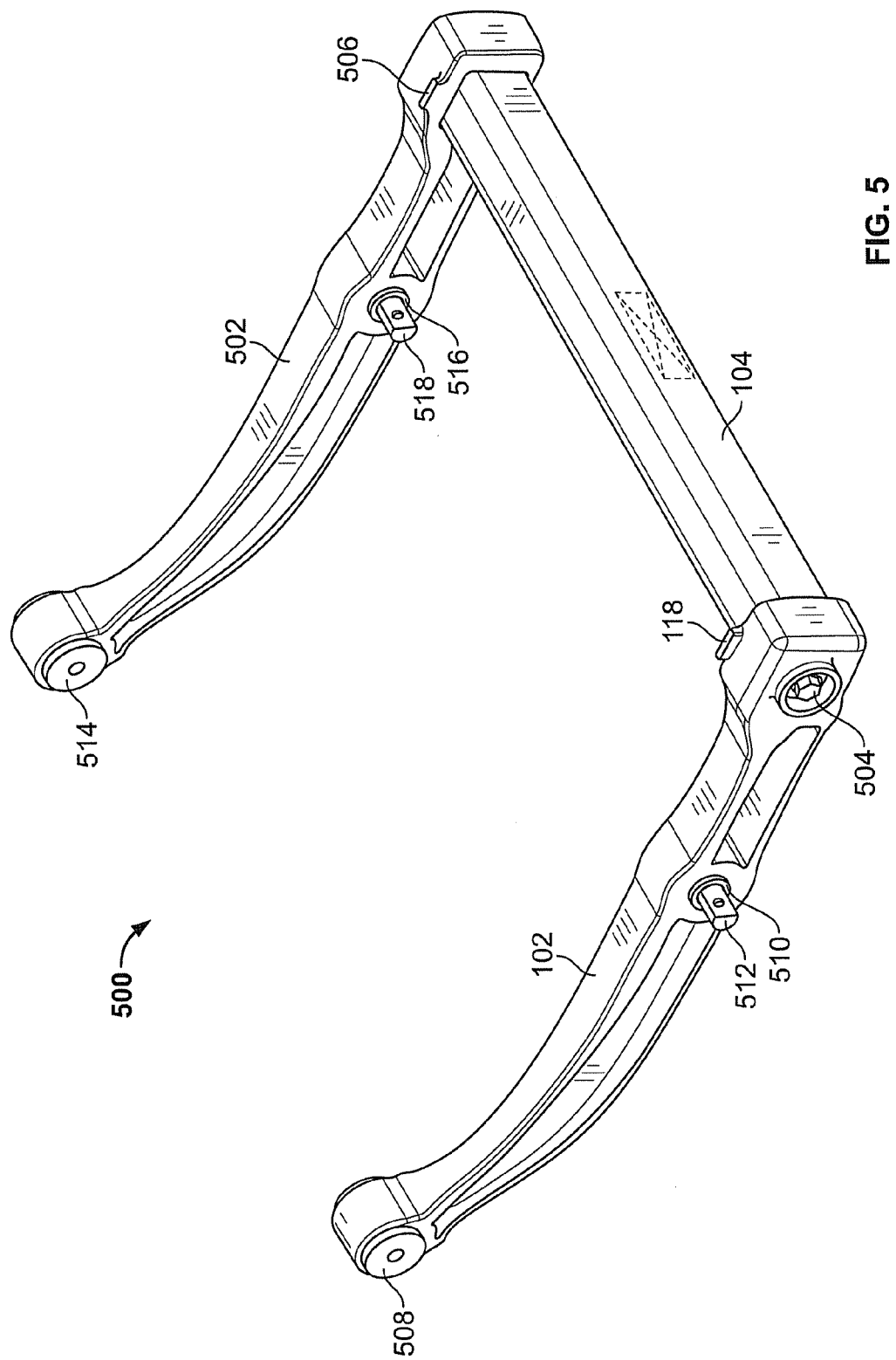
FIG. 5 depicts a U-assembly in accordance with an example embodiment.

An example vehicle suspension assembly may include a U-assembly that comprises a pair of support beams and a cross member (e.g. a cross tube, a cross bar, or a cross beam). FIG. 5 depicts an example U-assembly 500 comprising left-hand support beam 102, a cross tube 104, a fastener 504, and a right-hand support beam 502 including a locator-tab 506. As shown in FIG. 5, left-hand support beam 102 includes front pivot bushing 508, bushing 510, steel rod 512, and locator-tab 118. Right-hand support beam 502 comprises elements similar to those of left-hand support beam 102 except that right-hand support beam 502 is a mirror image of left-hand support beam 102. As shown in FIG. 5, a front pivot bushing 514 may be installed into a frame hanger mounting hole in right-hand support beam 502, and a bushing 516 and steel rod 518 may be installed into an axle clamp group mounting hole in right-hand support beam 502.

U-assembly 500 may be attached to various components of a vehicle or vehicle trailer. After attachment to the various components, U-assembly 500 or portions of U-assembly 500 may be removed from the various components for repairing or replacing U-assembly 500 or portions of U-assembly 500, or for some other reason.

Figure 11:
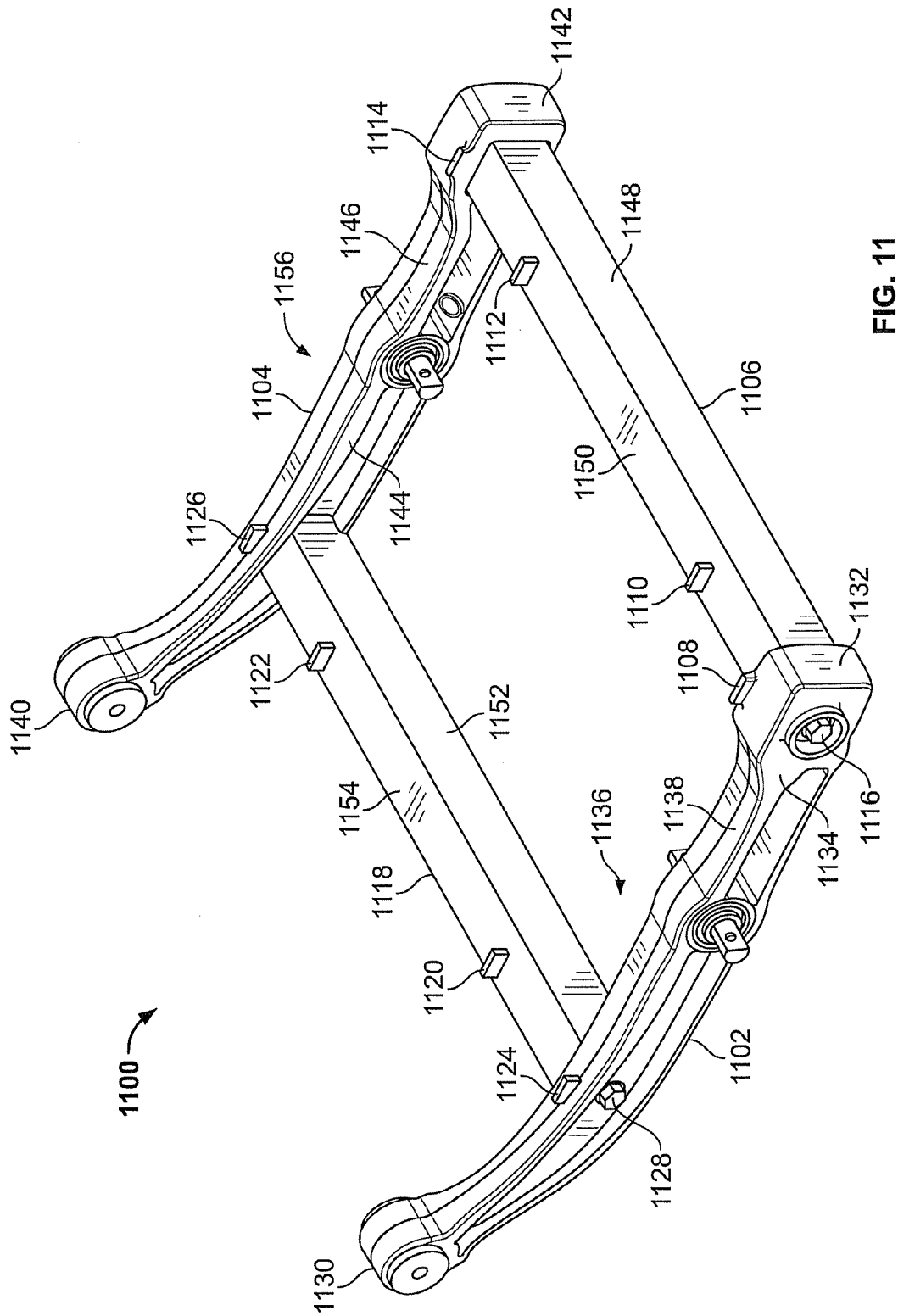
FIG. 11 depicts a U-assembly in accordance with an example embodiment.

Next, FIG. 11 illustrates an example U-assembly 1100 that includes a left-hand support beam 1102, a right-hand support beam 1104, and a cross member 1106. A fastener 1116 (e.g., a bolt) may be used to fasten left-hand support beam 1102 to cross member 1106. Similarly, another fastener (not shown, but similar to fastener 1116) may be used to fasten right-hand support beam 1104 to cross member 1106. FIG. 11 further illustrates a cross member 1118 that may be used in addition to or as an alternative to cross member 1106. A fastener 1128 (e.g., a bolt) may be used to fasten left-hand support beam 1102 to cross member 1118. Similarly, another fastener (not shown, but similar to fastener 1128) may be used to fasten right-hand support beam 1104 to cross member 1118.

Left-hand support beam 1102 includes a leading end 1130, a trailing end 1132, an outboard side 1134, an inboard side 1136, a top side 1138, and a bottom side (not shown). Right-hand support beam 1104 includes a leading end 1140, a trailing end 1142, an outboard side 1156, an inboard side 1144, a top side 1146, and a bottom side (not shown). Cross member 1106 includes a trailing side 1148, a top side 1150, a leading side (not shown) that is opposite trailing side 1148, and a bottom side (not shown) that is opposite top side 1150. Similarly, cross member 1118 includes a trailing side 1152, a top side 1154, a leading side (not shown) that is opposite trailing side 1152, and a bottom side (not shown) that is opposite top side 1154.

FIG. 11 illustrates a plurality of locator-tabs 1108, 1110, 1112, 1114, 1120, 1122, 1124, 1126. One or both of locator-tabs 1120, 1124 and one or both of locator-tabs 1122, 1126 may be used in an embodiment comprising cross member 1118. One or both of locator-tabs 1108, 1110 and one or both of locator-tabs 1112, 1114 may be used in an embodiment comprising cross member 1106.

FIG. 11 illustrates that each locator-tab on a support beam is located on the top side of the support beam and directly above a cross member receiving portion of the support beam. Alternatively, a portion of a locator-tab on the top side of a support beam could be positioned on a portion of the support beam top side that is adjacent to a portion of the top side directly above the cross member receiving portion.

FIG. 11 illustrates that locator-tabs may be located at various portions of a top side of a support beam relative to the inboard side and outboard side of the support beam. For example, locator-tab 1124 is positioned on top side 1138 at an equal distance from inboard side 1136 and outboard side 1134. As another example, locator-tab 1108 is positioned on top side 1138 such that an inboard side of locator-tab 1108 is even with inboard side 1136. As another example, a locator-tab on top side 1138 could be positioned such that an outboard side of the locator-tab is even with outboard side 1134. Other examples of locator-tab positions on top side 1138 relative to outboard side 1134 and inboard side 1136 are also possible.

FIG. 11 further illustrates that a locator-tab may be located at various portions of a top side of a support beam relative to a leading end of a support beam and a trailing end of a support beam. For example, locator-tab 1124 is located closer to leading end 1130 than it is to trailing end 1132. As another example, locator-tab 1108 is located closer to trailing end 1132 than it is to leading end 1130. Other examples of locator-tab position on top side 1138 relative to leading end 1130 and trailing end 1132 are also possible.

U-assembly 1100 may be used within a vehicle suspension assembly attached to a vehicle. Air spring assemblies comprising one or more locator-tab-slots may be positioned above one or more locator-tabs of U-assembly 1100 so as to provide a lateral restraint that restrains those air spring assemblies from moving in a lateral direction between two vehicle frame rails, such as frame rails 602, 603 (shown in FIG. 10).

4. Example Suspension Assemblies

Multiple support beams, a cross member (e.g., a cross tube, a cross bar, or a cross beam), and other components may be assembled to form a vehicle suspension assembly or portions of a vehicle suspension assembly. FIG. 1, FIG. 6, FIG. 7, and FIG. 10 will be described next with regard to various aspects of example vehicle suspension assemblies.

Figure 1:
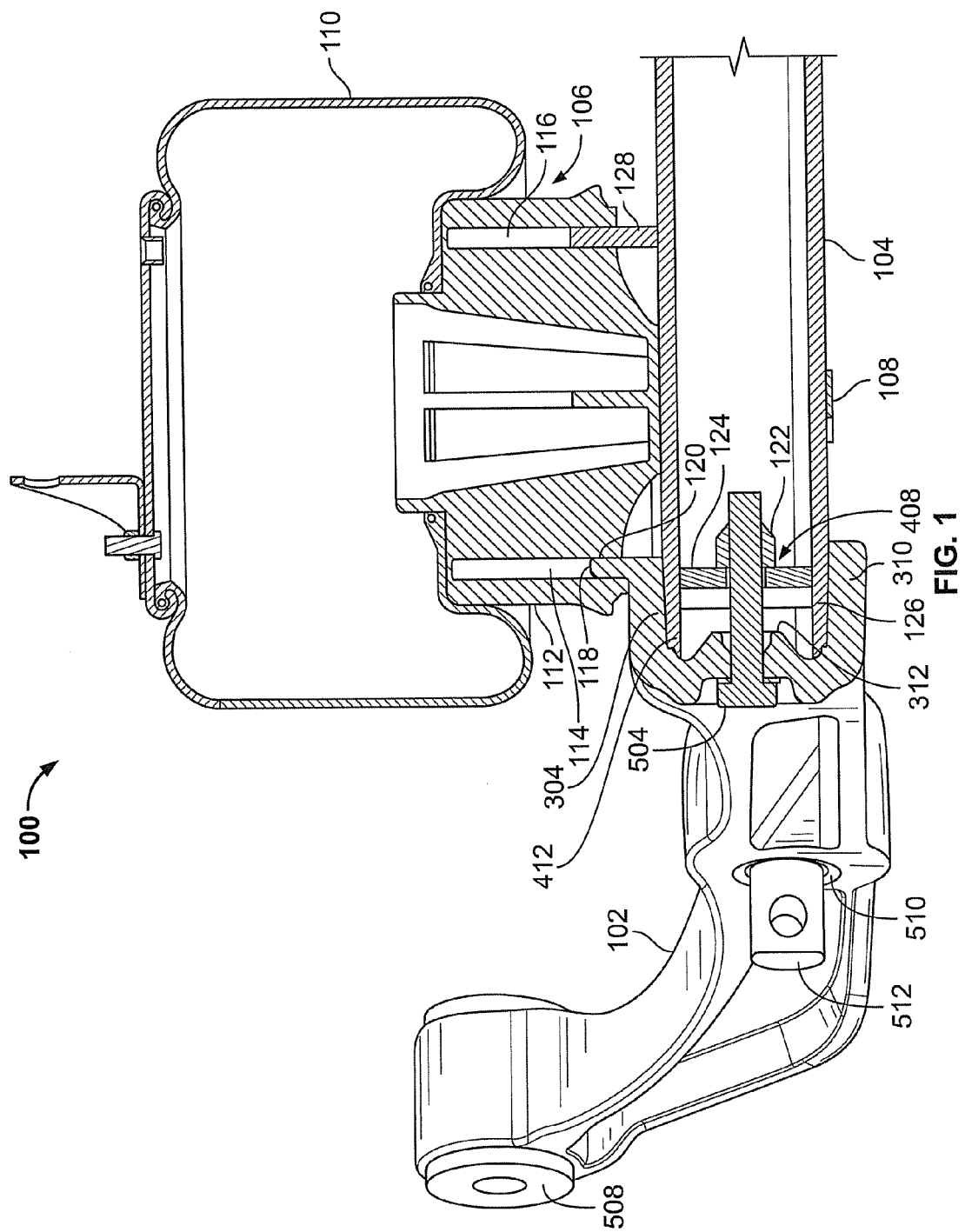
FIG. 1 is a partial sectional view of an example vehicle suspension assembly.

FIG. 1 is a partial sectional view of an example vehicle suspension assembly 100. As shown in FIG. 1, vehicle suspension assembly 100 includes left-hand support beam 102, cross tube 104, an air spring assembly 106 (or more simply, "air spring"), a retention strap 108, and a fastener 504. Air spring assembly 106 includes an air spring bellows 110 (or more simply "bellows") and an air spring piston 112 (or more simply "piston"). Air spring bellows 110 may be made from rubber or another material. Air spring piston 112 may be made from nylon (e.g., nylon 66), aluminum, or another material, and retention strap 108 may be made from a metal, such as aluminum or steel, or some other material.

Air spring piston 112 may include a locator-tab-slot 114 and a locator-tab-slot 116. Alternatively, air spring piston 112 may include a number of locator-tab-slots greater than or less than two. For example, in an example embodiment useable with heavy duty vocational trucks, air spring piston 112 may include only one locator-tab-slot.

Air spring piston 112 may include two threaded rods. The threaded rods may be inserted through retention strap 108, and threaded nuts may be fastened to the threaded rods so as to retain air spring piston 112, as well as the entire air spring assembly 106, to retention strap 108.

Left-hand support beam 102 includes a locator-tab 118. Locator-tab 118 includes a locator-tab inboard side 120. Air spring assembly 106 may be installed onto left-hand support beam 102 and cross tube 104 by: (i) positioning one of locator-tab-slot 114 and locator-tab-slot 116 above locator-tab 118, (ii) moving left-hand support beam 102, cross tube 104, and/or air spring assembly 106 so that locator-tab 118 enters the locator-tab-slot positioned above locator-tab 118, and (iii) fastening retention strap 108 to the threaded rods of air spring piston 112.

After installing air spring assembly 106 onto left-hand support beam 102 and cross tube 104, locator-tab 118 and locator-tab-slot 114 prevent or substantially reduce air spring assembly 106 and/or air spring piston 112 from sliding in a longitudinal direction along cross tube 104 (i.e., in a lateral direction between two frame rails to which vehicle suspension assembly 100 attaches).

Vehicle suspension assembly 100 may also include a locator-tab 128. Locator-tab 128 may be arranged in various configurations. For example, locator-tab 128 may be arranged as locator-tab 902 (shown in FIG. 9) or locator-tab 1202 (shown in FIG. 12). Locator-tab 128 may be inserted into locator-tab-slot 116. Locator-tab 128 and locator-tab-slot 116 prevent or substantially reduce air spring assembly 106 and/or air spring piston 112 from sliding along cross tube 104 in a direction parallel to a longitudinal axis of cross tube 104.

Left-hand support beam 102 and cross tube 104 may be made from any of a variety of materials. In general, left-hand support beam 102 may be made from a metal material, such as steel, titanium, iron, or some other metal. In particular, left-hand support beam 102 may be made from a heat treated iron, such as an austempered ductile iron, perhaps in conformance with an industry standard such as ASTM International A897/A897M-06. Left-hand support beam 102 may, for example, comprise a cast, a forged beam, or a fabricated beam. Cross tube 104 may, for example, comprise a cast or a rolled tube.

Cross tube 104 includes a support-beam-to-cross-tube-fastener 408. As an example, support-beam-to-cross-tube-fastener 408 may include a nut 122 and a plate 124. Nut 122 may be welded to plate 124, and plate 124 may be welded to interior walls of cross tube 104. As another example, support-beam-to-cross-tube-fastener 408 may include plate 124 without nut 122. In the example in which plate 124 is used without nut 122, plate 124 may comprise a tapped hole for receiving fastener 504.

FIG. 1 depicts front pivot bushing 508, bushing 510, and steel rod 512 that are installed into left-hand support beam 102. FIG. 1 depicts top wall 304, bottom wall 310, and back wall 312 of cross tube receiving portion 302 (shown in FIG. 3). FIG. 1 further depicts details of cross tube 104, namely a tapered top 412 and a tapered bottom 126 that are located at a cross tube tapered portion (shown in FIG. 4) of cross tube 104. In an alternative embodiment, the tapered walls of cross tube receiving portion 302 may be straight (i.e., non-tapered) and a tapered top, sides, and bottom of cross tube 104 may be straight.

Vehicle suspension assembly 100 also includes a right-hand support beam (not shown). That right-hand support beam may be arranged as right-hand support beam 502. Furthermore, in accordance with an example embodiment in which a given vehicle comprises vehicle suspension assembly 100, the given vehicle may comprise one or more other vehicle suspension assemblies configured as vehicle suspension assembly 100. Each of those other vehicle suspension assemblies on the given vehicle supports a single axle.

Figure 7:
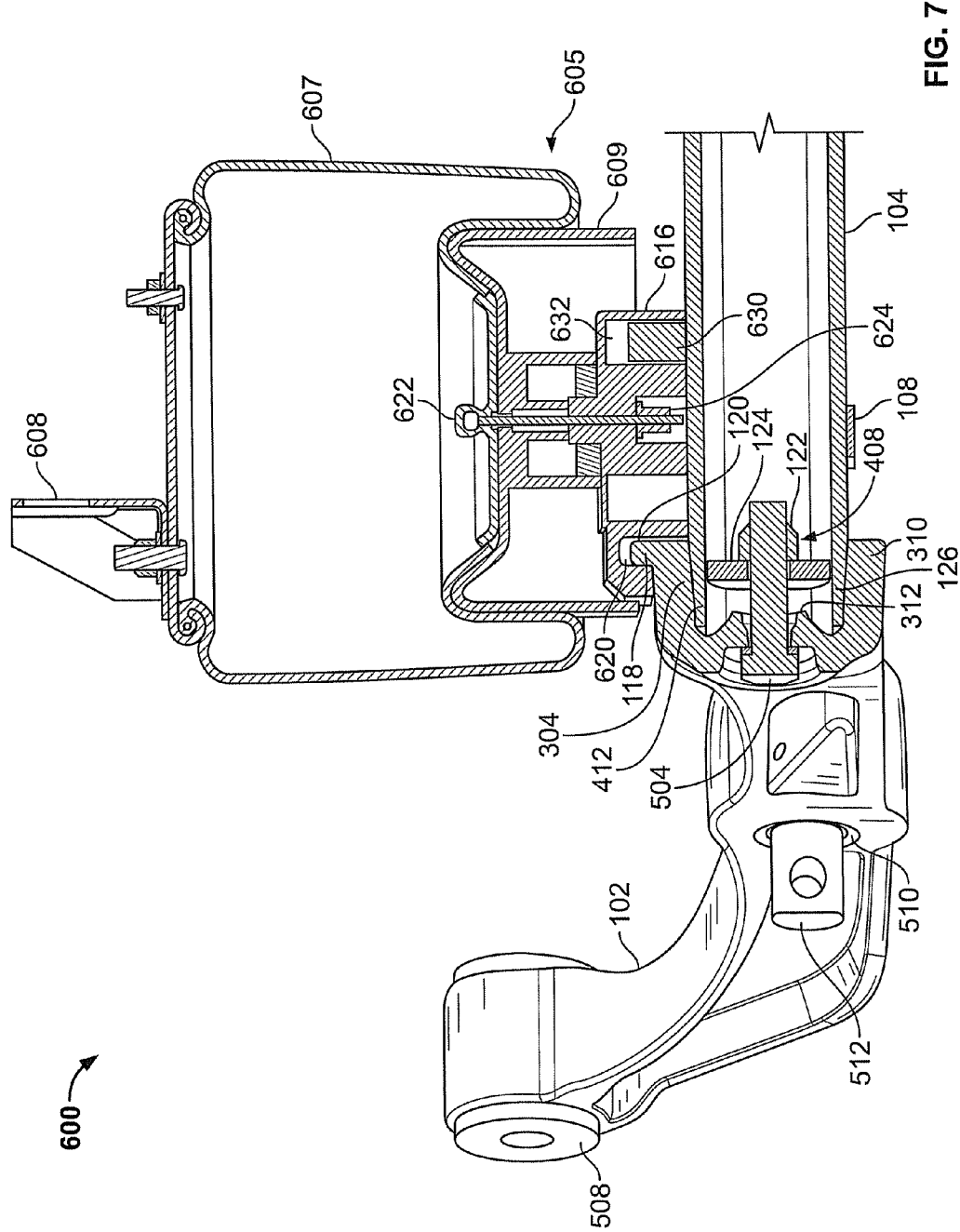
FIG. 7 depicts additional details of the suspension assembly shown in FIG. 6.

Next, FIG. 7 depicts a partial sectional view of a vehicle suspension assembly 600. Vehicle suspension assembly 600 includes left-hand support beam 102, cross tube 104, retention strap 108, and an air spring assembly 605. In an example embodiment, air spring assembly 605 includes air spring bellows 607, air-spring-assembly-to-frame-rail bracket 608, air spring piston 609, spacer 616, locator-tab-slot 620, a fastener 622 (e.g., a bolt or stud), and a nut 624. Although spacer 616 includes a locator-tab-slot 620, spacer 616 is not so limited. In this regard, spacer 616 may, for example, include multiple locator-tab-slots equally or non-equally spaced around spacer 616 (e.g., locator-tab-slot 620 and a locator-tab-slot 632).

Spacer 616 and air spring piston 609 may be fastened together via fastener 622 and nut 624. Additionally, spacer 616 and air spring piston 609 may, in combination, incorporate an interlock (e.g., a key and slot) to prevent and/or reduce spacer 616 twisting relative to air spring piston 609.

Vehicle suspension assembly 600 may also include a locator-tab 630. Locator-tab 630 may be arranged in various configurations. For example, locator-tab 630 may be arranged as locator-tab 902 (shown in FIG. 9) or locator-tab 1202 (shown in FIG. 12). Locator-tab 630 may be inserted into locator-tab-slot 632. Locator-tab 630 and locator-tab-slot 632 may prevent or substantially reduce air spring assembly 605 and/or air spring piston 609 from sliding along cross tube 104 in a direction parallel to a longitudinal axis of cross tube 104.

FIG. 7 depicts front pivot bushing 508, bushing 510, and steel rod 512 that are installed into left-hand support beam 102. FIG. 7 further depicts top wall 304, bottom wall 310, back wall 312, and locator-tab 118 of left-hand support beam 102. Locator-tab 630 and locator-tab-slot 632 can function together to position and restrain air spring assembly 605 within vehicle suspension assembly 600. Fastener 504 in combination with support-beam-to-cross-tube fastener 408 including nut 122 and plate 124 may be used to attach left-hand support beam 102 to cross tube 104.

Vehicle suspension assembly 600 also includes a right-hand support beam (not shown). That right-hand support beam may be arranged as right-hand support beam 502. Furthermore, in accordance with an example embodiment in which a given vehicle comprises vehicle suspension assembly 600, the given vehicle may comprise one or more other vehicle suspension assemblies configured as vehicle suspension assembly 600. Each of those vehicle suspension assemblies on the given vehicle supports a single axle.

Figure 6:
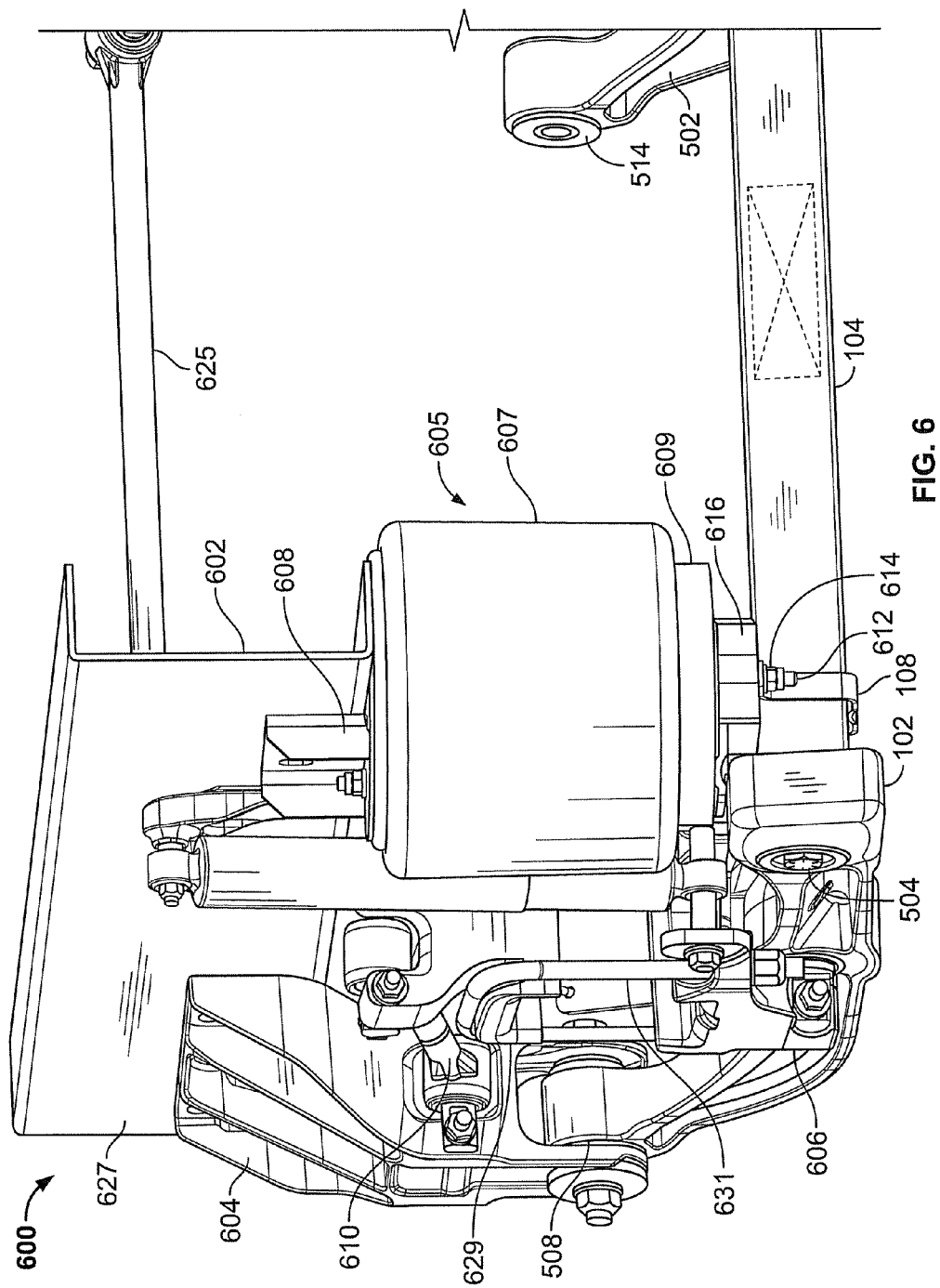
FIG. 6 depicts components of a vehicle suspension assembly in accordance with an example embodiment.

Next, FIG. 6 depicts an example vehicle suspension assembly 600 that includes components of U-assembly 500 shown in FIG. 5 (e.g., left-hand support beam 102, cross tube 104, and right-hand support beam 502). Cross tube 104 may be attached to left-hand support beam 102 via fastener 504 and to right-hand support beam via another fastener similar to fastener 504.

Figure 10:
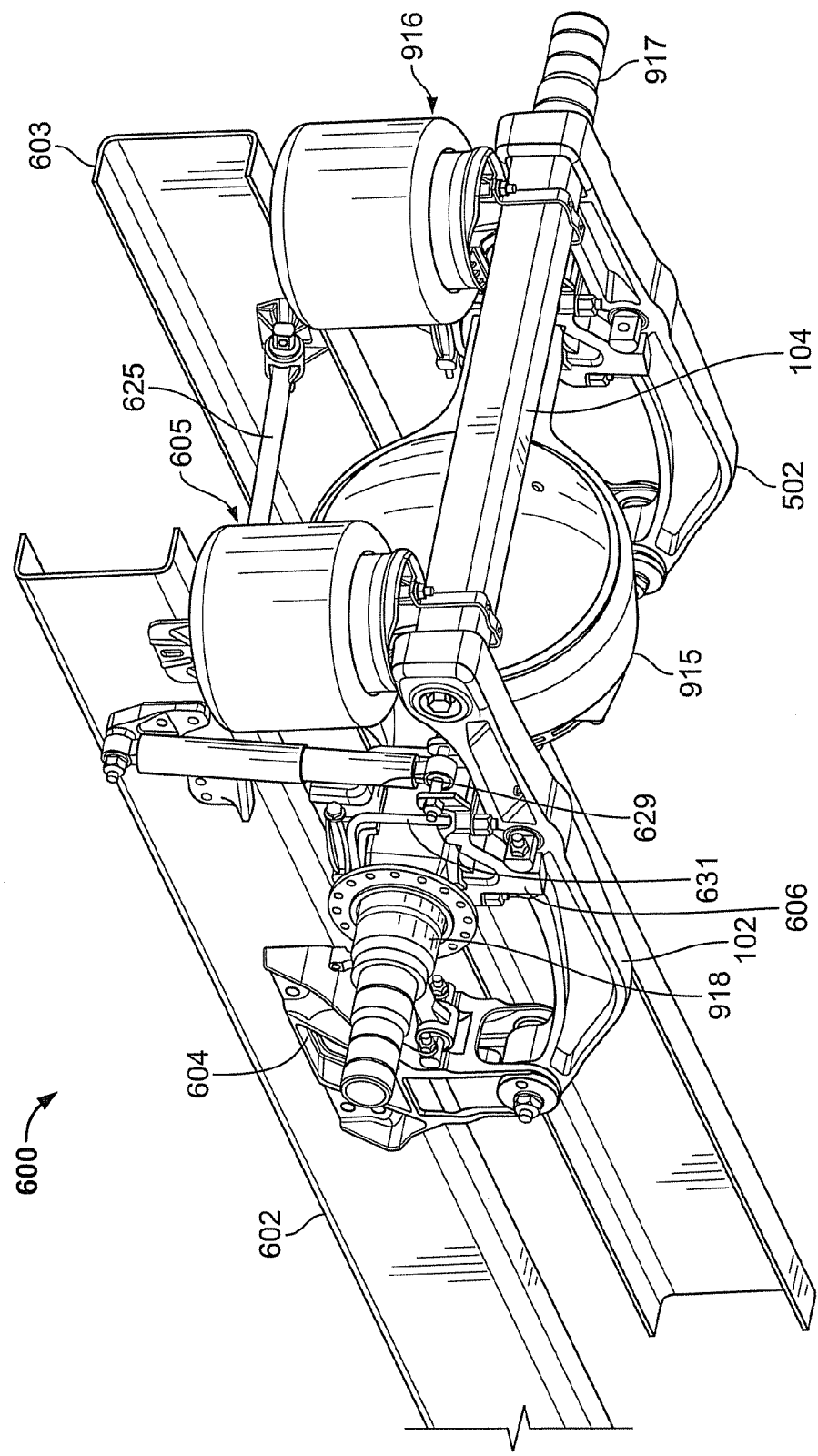
FIG. 10 depicts additional details of the vehicle suspension assembly shown in FIG. 6 and FIG. 7.

As shown in FIG. 6, vehicle suspension assembly 600 attaches to a left-hand frame rail 602. Vehicle suspension assembly 600 may also attach to another frame rail (e.g., a right-hand frame rail 603, as shown in FIG. 10). The other frame rail may be substantially parallel to left-hand frame rail 602. Vehicle suspension assembly 600 may be installed on vehicles operable to carry and/or haul a maximum load that exceeds the maximum load that may be carried and/or hauled in a vehicle using vehicle suspension assembly 100. In this regard, vehicle suspension assembly 100 may be referred to as a low-capacity suspension assembly and vehicle suspension assembly 600 may be referred to as a high-capacity suspension assembly.

Referring to FIG. 6, vehicle suspension assembly 600 includes left-hand support beam 102, cross tube 104, right-hand support beam 502 including front pivot bushing 514, an air spring assembly 605, retention strap 108, a frame hanger 604, an air-spring-assembly-to-frame-rail bracket 608, a longitudinal torque rod 610, a transverse torque rod 625, and a left-hand axle clamp group including (i) an axle seat 606, (ii) a top pad 629, (iii) an outboard U-bolt 631, and (iv) an inboard U-bolt (not shown). Top pad 629 may be cast iron. Frame hanger 604 and air-spring-assembly-to-frame-rail bracket 608 are shown as being attached to an outboard side 627 of left-hand frame rail 602.

Preferably, vehicle suspension assembly 600 includes a right-hand axle clamp group and another air spring, retention strap, frame hanger, air-spring-to-frame-rail bracket, and a longitudinal torque rod for a right-hand side of vehicle suspension assembly 600 (i.e., a side including right-hand support beam 502). Vehicle suspension assembly 600 also includes: (i) a threaded rod 612 (e.g., a threaded stud) of spacer 616, (ii) a threaded nut 614 used to retain retention strap 108 to spacer 616, and (iii) front pivot bushing 508. Transverse torque rod 625 may attach to an inboard side of a frame rail (e.g., left-hand frame rail 602 or right-hand frame rail 603 (shown in FIG. 10)) and a differential housing 915 (shown in FIG. 10). Another threaded rod similar to threaded rod 612 and another threaded nut similar to threaded nut 614 are located on the opposite side of air spring assembly 605 and are further used to retain retention strap 108 to spacer 616.

The left-hand axle clamp group clamps a left-hand side of an axle assembly. In particular, outboard U-bolt 631 and an inboard U-bolt may clamp an axle housing (not shown) to top pad 629 and axle seat 606. The right-hand axle clamp group clamps a right-hand side of the axle assembly in a manner similar to how the left-hand axle clamp group clamps the left-hand side of the axle assembly. The longitudinal torque rod 610 may be used, for example, to prevent and/or reduce the clamped axle from twisting and to adjust a pinion angle associated with the clamped axle assembly.

Air spring assembly 605 includes an air spring bellows 607 (or more simply "bellows"), an air spring piston 609 (or more simply "piston"), and a spacer 616. Air spring piston 609 and spacer 616 may be attached to each other via a bolt and nut. Air spring bellows 607 may be made from rubber or another material. Air spring piston 609 and/or spacer 616 may be made from nylon (e.g., nylon 66), aluminum, or another material. Since air spring manufacturers may manufacture pistons to meet an industry standard, spacer 616 may be manufactured to attach to a piston meeting the industry standard.

In accordance with an example embodiment in which a given vehicle comprises vehicle suspension assembly 600, the given vehicle may comprise one or more other vehicle suspension assemblies configured as vehicle suspension assembly 600. Each of these vehicle suspension assemblies on the given vehicle supports a single axle.

Next, FIG. 10 depicts additional details of vehicle suspension assembly 600 including components of U-assembly 500 shown in FIG. 5 (e.g., left-hand support beam 102, cross tube 104, and right-hand support beam 502). For example, vehicle suspension assembly 600 includes left-hand frame rail 602, right-hand frame rail 603, frame hanger 604, air spring assembly 605, axle seat 606, transverse torque rod 625, top pad 629, and outboard U-bolt 631. Furthermore, vehicle suspension assembly 600 includes an air spring assembly 916 adjacent to right-hand support beam 502, a differential housing 915, an axle housing right-hand spindle 917, an axle housing left-hand spindle 918. Right-hand support beam 502 attaches to right-hand frame rail 603 via another frame hanger (not shown) and another air-spring-assembly-to-frame-hanger bracket (not shown).

5. Example Retention Strap

Figure 8:
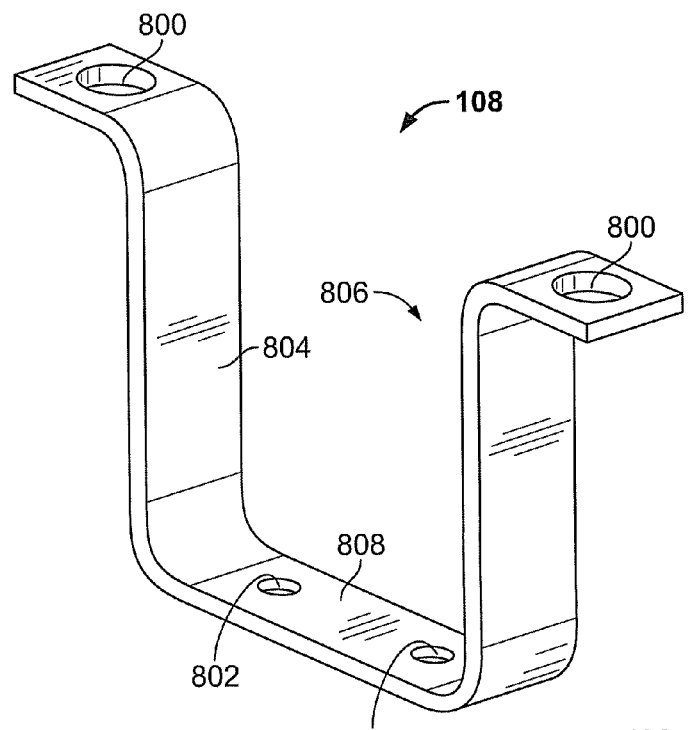
FIG. 8 depicts a retention strap in accordance with an example embodiment.

FIG. 8 depicts details of retention strap 108. As shown in FIG. 8, retention strap 108 includes through-holes 800, 802, a retention strap inner side 804, a retention strap inner side 806, and a retention strap inner bottom 808. During assembly of vehicle suspension assembly 100 and vehicle suspension assembly 600, retention strap 108 and cross tube 104 may be brought together such that two sides of cross tube 104 respectively contact retention strap inner side 804 and retention strap inner side 806, and a bottom of cross tube 104 contacts retention strap inner bottom 808.

The threaded rods of air spring piston 112 may be inserted through through-holes 800, and threaded nuts may be fastened to the threaded rods so as to retain air spring piston 112, as well as the entire air spring assembly 106, to retention strap 108. Through-holes 802 may be used during manufacture of retention strap 108 so as to obtain a desired placement of through-holes 800.

6. Example Cross Members

Various example embodiments described above include embodiments having left-hand support beam 102 and right-hand support beam 502. In accordance with each of those embodiments, a cross member may be removably connected to left-hand support beam 102 and right-hand support beam 502. For convenience sake, the cross member of those embodiments was described as a cross tube. The cross member is not so limited. The cross member may be arranged in any of a variety of configurations. For example, the cross member may comprise a cross bar (e.g., a bar), a cross tube (e.g., a tube), or a cross beam (e.g., an I-beam), and the cross member may be made from any of a variety metals (e.g., steel, iron, titanium, or aluminum), a composite material, or some other material. Additionally or alternatively, a cross member cross-section, perpendicular to a longitudinal axis of the cross member, may comprise a circular cross section, an oval cross section, a rectangular cross section, a square cross section, or some other cross section shape.

Each cross member may comprise a first cross member end and a second cross member end that is removably inserted into a respective cross member receiving portion of a left-hand support beam and a right-hand support beam. For cross tube 104, the first cross member end comprises cross tube end portion 400 and the second cross member end comprises cross tube end portion 402.

Each cross member may comprise a first support-beam-to-cross-member fastener for receiving a fastener (e.g., a bolt) that passes through a mounting hole in a left-hand support beam, and a second support-beam-to-cross-member fastener for receiving a fastener (e.g., a bolt) that passes through a mounting hole in a right-hand support beam. For cross tube 104, the first support-beam-to-cross-member fastener may comprise support-beam-to-cross-tube fastener 408.

Figure 4:
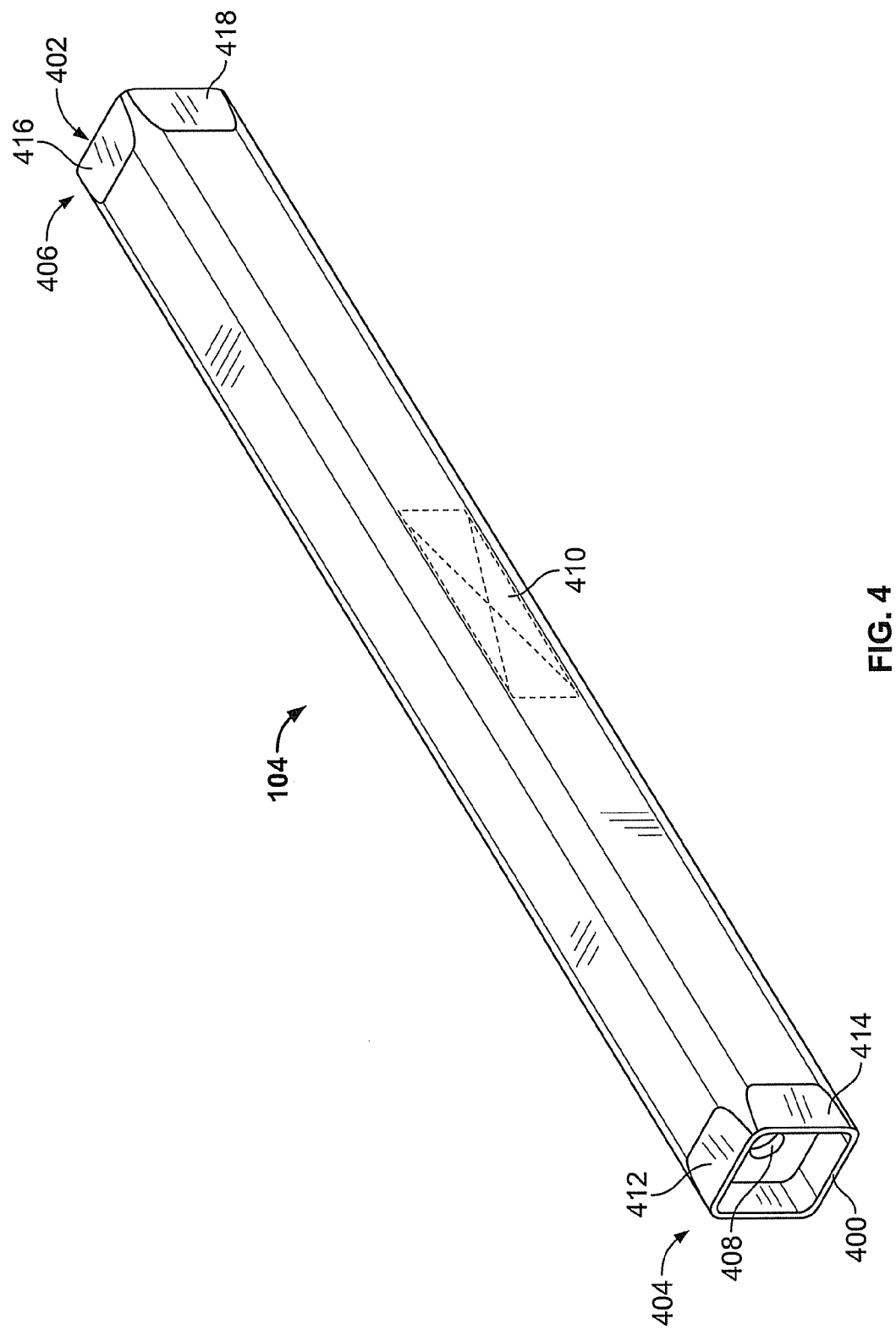
FIG. 4 depicts a cross tube in accordance with an example embodiment.

FIG. 4 depicts details of a cross member arranged as cross tube 104. As shown in FIG. 4, cross tube 104 includes a cross tube end portion 400, a cross tube end portion 402, a cross tube tapered portion 404 on the outside surface of cross tube 104, a cross tube tapered portion 406 on the outside surface of cross tube 104, a support-beam-to-cross-tube fastener 408, and a cross tube label 410. Cross tube label 410 may, for example, comprise any of a variety of information regarding cross tube 104 and/or information comprising a vehicle suspension assembly that comprises cross tube 104.

In accordance with an example embodiment, cross tube tapered portion 404 includes a tapered top 412, a tapered bottom (on a side of cross tube tapered portion 404 opposite tapered top 412), a tapered side 414, and another tapered side (on a side of cross tube tapered portion 404 opposite tapered side 414). Similarly, cross tube tapered portion 406 includes a tapered top 416, a tapered bottom (on a side of cross tube tapered portion 406 opposite tapered top 416), a tapered side 418, and another tapered side (on a side of cross tube tapered portion 406 opposite tapered side 418). Cross tube tapered portion 404 may be inserted into cross tube receiving portion 302 (shown in FIG. 3). A fastener (e.g., fastener 504 shown in FIG. 1, FIG. 5, and FIG. 6) may be inserted through cross tube mounting hole 204 and fastened to support-beam-to-cross-tube fastener 408.

Support-beam-to-cross-tube fastener 408 may include a threaded portion for receiving a bolt placed through cross tube mounting hole 204. Support-beam-to-cross-tube-fastener 408 may, for example, be located 25 mm to 100 mm away from cross tube end portion 400.

Cross tube 104 may include another support-beam-to-cross-tube fastener (not shown). This other support-beam-to-cross-tube fastener may, for example, be located 25 mm to 100 mm away from cross tube end portion 402, and may include a threaded portion for receiving a bolt placed through a cross tube mounting hole of another support beam (e.g., right-hand support beam 502 shown in FIG. 5, FIG. 6, and FIG. 10).

Cross tube tapered portion 404 of cross tube 104 may be inserted into left-hand support beam 102. Thereafter, cross tube 104 and left-hand support beam 102 may be fastened together by threading fastener 504 into support-beam-to-cross-tube fastener 408. As an example, fastener 504 may comprise a bolt, such as a hex head bolt. Fastener 504 may be removed from support-beam-to-cross-tube fastener 408 so as to service and/or replace left-hand support beam 102 and/or cross tube 104.

Similarly, cross tube tapered portion 406 of cross tube 104 may be inserted into right-hand support beam 502. Cross tube 104 and right-hand support beam 502 may be fastened together by threading a fastener similar to fastener 504 into another support-beam-to-cross-tube fastener that is located within cross tube 104. The other fastener may be removed from the other support-beam-to-cross-tube fastener in order to service and/or replace right-hand support beam 502 and/or cross tube 104.

Figure 9:
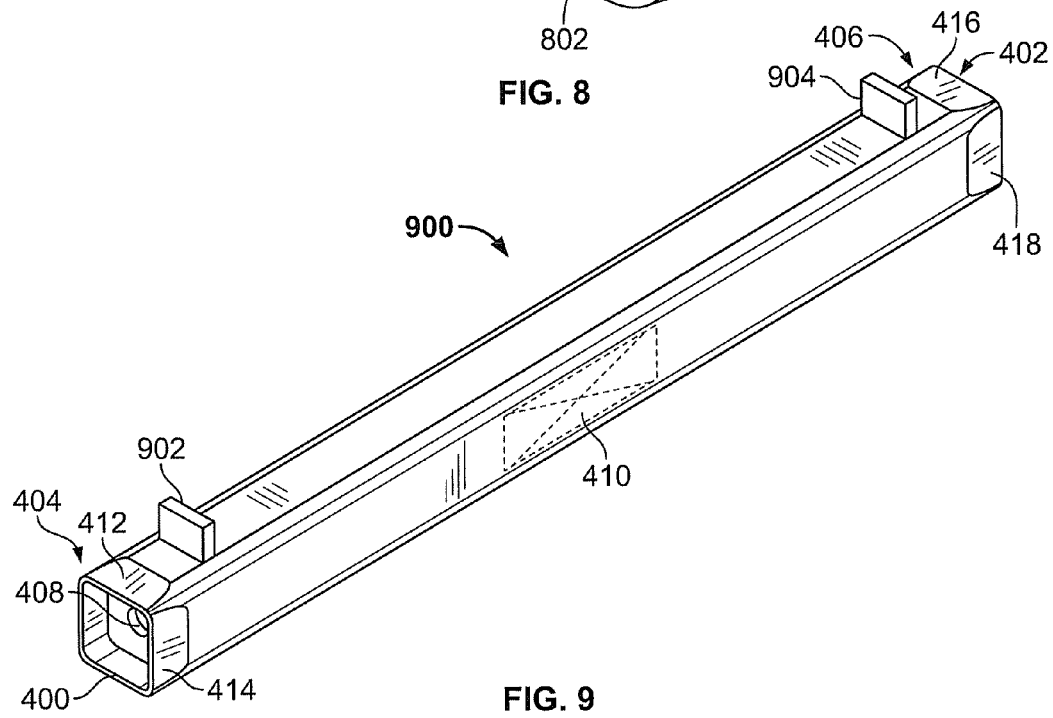
FIG. 9 depicts a cross tube in accordance with an example embodiment.

Next, FIG. 9 depicts details of a cross member arranged as cross tube 900. Similar to cross tube 104, cross tube 900 includes a cross tube end portion 400, a cross tube end portion 402, a cross tube tapered portion 404, a cross tube tapered portion 406, and a support-beam-to-cross-tube fastener 408. Additionally, cross tube 900 may include a locator-tab 902, a locator-tab 904, and another support-beam-to-cross-tube fastener near cross tube end portion 402.

Cross tube 900 may comprise any of a variety of tubes. For example, cross tube 900 may comprise a cast or hydroformed tube. As another example, cross tube 900 may comprise a rolled tube having cross tube locator-tab 902 and cross tube locator-tab 904 attached via welding and/or fasteners (e.g., bolts).

In accordance with this embodiment, cross tube 104, as shown in FIG. 1, may be replaced with cross tube 900, such that cross tube locator-tab 902 may enter locator-tab-slot 116. In this way, locator-tab 118 and locator-tab 902 may be used to prevent or substantially reduce air spring assembly 106 from sliding in a longitudinal direction along cross tube 900. Alternatively, left-hand support beam 102 of vehicle suspension assembly 100 may be replaced with a support beam that does not include locator-tab 118. In this way, only locator-tab 902 may enter either of locator-tab-slot 114 and locator-tab-slot 116.

Locator-tab 904 may be used alone, or in combination with locator-tab 506, during the positioning of another air spring assembly in a vehicle suspension assembly (e.g., vehicle suspension assembly 600).

7. Alternative Locator-Tabs

Figure 12:
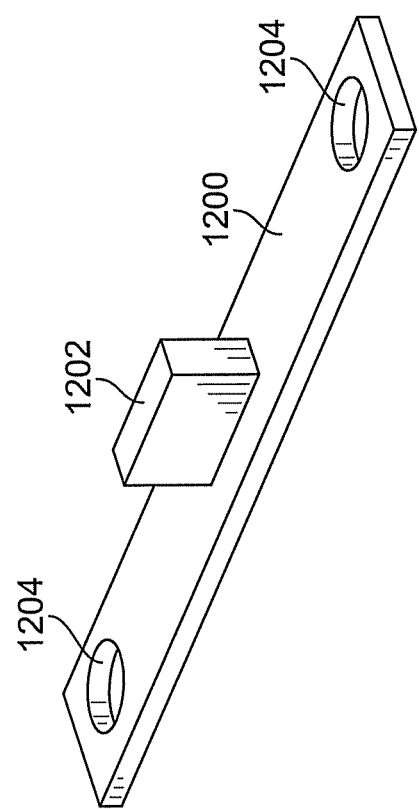
FIG. 12 depicts a locator-tab plate in accordance with an example embodiment.

In addition to the locator-tabs described above (e.g., a locator-tab on a support beam or on a cross member), the example embodiments may use alternative locator-tab arrangements. FIG. 12 illustrates a locator-tab plate 1200 that can be attached to various components of a vehicle suspensions assembly.

As shown in FIG. 12, locator-tab plate 1200 includes a locator-tab 1202 and though-holes 1204. Locator-tab plate 1200 may be attached to a supplemental retention strap. The supplemental retention strap may be arranged as retention strap 108. For purposes of this description, the elements of retention strap 108 are used to refer to similar elements of the supplemental retention strap. Each through-hole 1204 corresponds to a respective through-hole 800 in the supplemental retention strap. The supplemental retention strap can be placed adjacent to a cross tube (e.g., cross tube 104) such that retention strap inner side 804 and retention strap inner side 806 contact outer side walls of cross tube 104, and retention strap inner bottom 808 contacts an outer bottom wall of cross tube 104. The locator-tab plate 1200 can be placed upon an outer top wall of cross tube 104, and fasteners (e.g., bolts), placed through through-holes 800 and through-holes 1204, can be used to attach locator-tab plate 1200 and the supplemental retention strap to cross tube 104. Additionally or alternatively, locator-tab plate 1200 could be welded to the supplemental retention strap or attached to the supplemental retention strap and/or cross tube 104 via some other means.

Locator-tab 1202, when placed within a locator-tab-slot, may, in combination with the locator-tab-slot, prevent or substantially reduce an air spring assembly and/or air spring piston from sliding along a cross member in a direction parallel to a longitudinal axis of the cross member.

8. Conclusion

Example embodiments of the present invention have been described above. Those skilled in the art will understand, however, that changes and modifications may be made to the described embodiments without departing from the true scope and spirit of the present invention.

We claim:

1. A vehicle suspension assembly comprising:
   a first spring that comprises a first locator-tab-slot;
   a second spring that comprises a second locator-tab-slot;
   a first support beam having a first locator-tab positioned on a top surface of the first support beam either between an inboard side and an outboard side of the first support beam or at an inboard side or outboard side of the first support beam;
   a second support beam having a second locator-tab positioned on a top surface of the second support beam either between an inboard side and an outboard side of the second support beam or at an inboard side or outboard side of the second support beam; and
   a cross member connected to the first support beam and to the second support beam,
   wherein the first locator-tab is positioned within the first locator-tab-slot, and
   wherein the second locator-tab is positioned within the second locator-tab-slot.

2. The vehicle suspension of claim 1, wherein the first support beam and the first locator-tab are integrally formed in a casting or a forging process and the second support beam and the second locator-tab are integrally formed in a casting or a forging process.

3. The vehicle suspension of claim 1,
   wherein the first locator-tab is permanently positioned on the top surface of the first support beam and the second locator-tab is permanently positioned on the top surface of the second support beam.

4. The vehicle suspension of claim 1,
   wherein the first locator tab extends longitudinally along the top surface of the first support member and the second locator tab extends longitudinally along the top surface of the second support member.

5. The vehicle suspension assembly of claim 1,
wherein the first support beam comprises a first cross-member-receiving-portion,
wherein the second support beam comprises a second cross-member-receiving-portion,
wherein the cross member comprises a first cross-member-end that is positioned within the first cross-member-receiving-portion, and
wherein the cross member comprises a second cross-member-end that is positioned within the second cross-member-receiving-portion,
wherein at least a portion of the first locator-tab is located above the first cross-member-receiving-portion, and
wherein at least a portion of the second locator-tab is located above the second cross-member-receiving-portion.

6. The vehicle suspension assembly of claim 5,
wherein the first locator-tab is centered between an outboard side of the first support beam and an inboard side of the first support beam, and
wherein the second locator-tab is centered between an outboard side of the second support beam and an inboard side of the second support beam.

7. The vehicle suspension assembly of claim 5,
wherein an inboard side of the first locator-tab is even with at least a portion of an inboard side of the first support beam, and
wherein an inboard side of the second locator-tab is even with at least a portion of an inboard side of the second support beam.

8. The vehicle suspension assembly of claim 5,
wherein an outboard side of the first locator-tab is even with at least a portion of an outboard side of the first support beam, and
wherein an outboard side of the second locator-tab is even with at least a portion of an outboard side of the second support beam.

9. The vehicle suspension assembly of claim 1, wherein the first spring is an air spring and the second spring is an air spring.

10. A vehicle suspension assembly comprising:
a first spring that comprises a first locator-tab-slot;
a second spring that comprises a second locator-tab-slot;
a first support beam that comprises a first locator-tab extending longitudinally along a top surface of the first support beam;
a second support beam that comprises a second locator-tab extending longitudinally along a top surface of the second support beam; and
a cross tube connected to the first support beam and to the second support beam,
wherein the first locator-tab is positioned within the first locator-tab-slot, and
wherein the second locator-tab is positioned within the second locator-tab-slot.

11. The vehicle suspension assembly of claim 10,
wherein the first support beam comprises a first cross-tube-receiving-portion,
wherein the second support beam comprises a second cross-tube-receiving-portion,
wherein the cross tube comprises a first cross-tube-end that is positioned within the first cross-tube-receiving-portion,
wherein the cross tube comprises a second cross-tube-end that is positioned within the second cross-tube-receiving-portion,
wherein at least a portion of the first locator-tab is located above the first cross-tube-receiving-portion, and
wherein at least a portion of the second locator-tab is located above the second cross-tube-receiving-portion.

12. The vehicle suspension assembly of claim 11,
wherein the first locator-tab comprises an inboard side, an outboard side, and a top side,
wherein the top side of the first locator-tab comprises a sloped surface extending from the outboard side of the first locator-tab to the inboard side of the first locator-tab,
wherein the second locator-tab comprises an inboard side, an outboard side, and a top side,
wherein the top side of the second locator-tab comprises a sloped surface extending from the outboard side of the second locator-tab to the inboard side of the second locator-tab.

13. The vehicle suspension assembly of claim 10,
wherein the first locator-tab is permanently positioned on the top surface of the first support beam and the second locator-tab is permanently positioned on the top surface of the second support beam.

14. The vehicle suspension assembly of claim 10, further comprising:
a third locator-tab; and
a fourth locator-tab,
wherein the first spring further comprises a third locator-tab-slot,
wherein the second spring further comprises a fourth locator-tab-slot,
wherein the third locator-tab is positioned within the third locator-tab-slot, and
wherein the fourth locator-tab is positioned within the fourth locator-tab-slot.

15. The vehicle suspension assembly of claim 10,
wherein the first spring comprises a first bellows, a first piston, and a first spacer,
wherein the second spring comprises a second bellows, a second piston, and a second spacer,
wherein the first piston is fastened to the first spacer,
wherein the second piston is fastened to the second spacer,
wherein the first locator-tab-slot is located within the first spacer, and
wherein the second locator-tab-slot is located within the second spacer.

16. The vehicle suspension assembly of claim 10,
wherein the first support beam and the first locator-tab are integrally formed in a casting or a forging process and the second support beam and the second locator-tab are integrally formed in a casting or a forging process.

17. The vehicle suspension assembly of claim 10, wherein the first spring is an air spring and the second spring is an air spring.

* * * * *